(12) United States Patent
Kawashima et al.

(10) Patent No.: US 8,432,508 B2
(45) Date of Patent: Apr. 30, 2013

(54) LIQUID CRYSTAL DISPLAY APPARATUS

(75) Inventors: Kouji Kawashima, Kanagawa (JP); Hideki Kujiraoka, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 146 days.

(21) Appl. No.: 13/040,920

(22) Filed: Mar. 4, 2011

(65) Prior Publication Data

US 2011/0249213 A1    Oct. 13, 2011

(30) Foreign Application Priority Data

Apr. 7, 2010   (JP) .................................... 2010-88519

(51) Int. Cl.
*G02F 1/1333*   (2006.01)
(52) U.S. Cl.
USPC ........................................................... 349/58

(58) Field of Classification Search .................... 349/58
See application file for complete search history.

(56) References Cited

U.S. PATENT DOCUMENTS 7,580,089 B2 *   8/2009   Ho et al. ......................... 349/58

FOREIGN PATENT DOCUMENTS

| JP | 4-9090 | 1/1992 |
|----|--------|--------|
| JP | 2001-194649 | 7/2001 |

* cited by examiner

*Primary Examiner* — James Dudek
(74) *Attorney, Agent, or Firm* — Young & Thompson

(57) ABSTRACT

A liquid crystal display apparatus which stores a panel unit in an internal space formed by a front cover and a rear cover include a nail part which is formed on one of side panels of the front cover or the rear cover, and is perpendicular to a plate face of the side panel; and a hole part which is formed in a vicinity area of one of sides of the cover on which the nail part is not formed, and the nail part is inserted in.

10 Claims, 17 Drawing Sheets

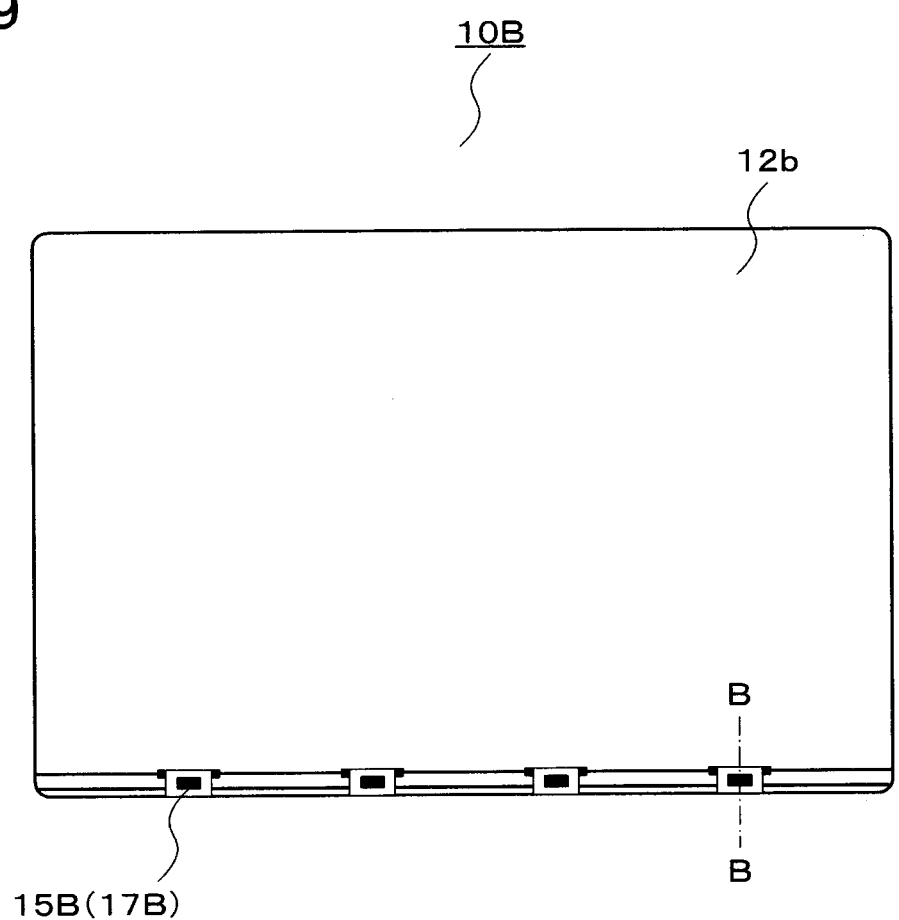

LIQUID CRYSTAL DISPLAY APPARATUS

This application is based upon and claims the benefit of priority from Japanese Patent Application No. 2010-088519, filed on Apr. 7, 2010, the disclosure of which is incorporated herein in its entirety by reference.

TECHNICAL FIELD

The present invention relates to a liquid crystal display apparatus, and particularly relates to a liquid crystal display apparatus provided with an engaging mechanism which joins a front cover and a rear cover together.

BACKGROUND ART

Generally, it is requested to reduce size and weight and increase strength highly for an electronic apparatus such as a liquid crystal display apparatus. Each of requests such as reduction in size, reduction in weight and high increase in strength is not a selective request. That is, for example, it is not allowed to sacrifice the strength in order to satisfy reduction in size and reduction in weight.

A liquid crystal display apparatus includes a panel unit and a cover which stores this panel unit. Accordingly, in order to meet the above-mentioned requests to a liquid crystal display apparatus, reduction in size, reduction in weight and high increase in strength for a panel unit and a cover have been practiced.

In Japanese Patent Application Publication No. 2001-194649, a configuration provided with a cover 102 which stores a panel unit 101 is proposed as shown in FIG. 26. The cover 102 consists of a box-shaped front cover 103 in which an upper side face is opening and a box-shaped rear cover 104. Opening parts 107 are formed on a side panel 105 of the front cover 103, and convex projecting parts 108 are formed on a side panel 106 of the rear cover 104 corresponding to each position of the opening part 107. Accordingly, when the rear cover 104 is inserted into the front cover 103 so that the side panel 105 may be located outside the side panel 106, each of the projecting parts 108 fits into the corresponding the opening part 107, and the front cover 103 and the rear cover 104 are engaged. And, space formed between the front cover 103 and the rear cover 104 will become storage space of the panel unit 101.

At that time, because the side panel 105 of the front cover 103 and the side panel 106 of the rear cover 104 overlap, the strength of the lapped part of these side panels becomes higher than the strength of the other parts. However, it is insufficient for a liquid crystal display apparatus to improve only the strength of the side part, because it is not aimed at improving the strength of a panel surface side and a panel rear side where the improvement in strength is most desired in a liquid crystal display apparatus. That is, the strength of the side part of a liquid crystal display apparatus is improved by the structure on which the side panels overlap, however, such an improvement in strength of the side part has brought higher strength compared with the strength of the other parts. Thus, a part with the strength partially more than necessary will be the excess strength.

However, when the side panel 105 and the side panel 106 overlap, it arises to an inconvenience, for example, that a liquid crystal display apparatus becomes larger in size by the thickness of the side panel 106 and heavier in weight by the weight of the side panel 106, because the thickness of the side part of the liquid crystal display apparatus will be a total of the thickness of the side panel 105 and the side panel 106.

Accordingly, in a configuration according to Japanese Patent Application Publication No. 2001-194649, it is not possible to improve reduction in size, reduction in weight and high increase in strength non-selectively.

On the other hand, a liquid crystal display apparatus as shown in FIG. 27 is proposed in Japanese Utility Model Application Publication No. 1992-9090. This liquid crystal display apparatus forms storage space for a panel unit 120 between a printed wiring board 121 and a frame 123. An engagement piece 125 is formed on each side panel 124 of the frame 123, and also each hole 126 for inserting the engagement piece 125 where a bending part of the engagement piece 125 is inserted is formed in the printed wiring board 121. A concave part 128 which is communicated with the hole 126 is formed in the printed wiring board 121, and the concave part 128 stores the bending part of the engagement piece 125 which has been inserted into the hole 126 and bent. Further, a connection member 127 made of electrically conductive rubber which can also be used as a spacer is arranged inside the side panel 124 of the frame 123.

In case of such configuration, it arises an inconvenience that the liquid crystal display apparatus becomes larger in size because the minimum thickness of the side part of the liquid crystal display apparatus becomes a total of the thickness of the side panel 124 and the connection member 127. Also, any contribution to improve strength cannot be expected to the connection member 127 because it is made of conductive rubber, rather there is an inconvenience that the liquid crystal display apparatus becomes heavier by its weight as the connection member 127 also has weight.

Thus, it has been difficult to satisfy each requirement of reduction in size, reduction in weight and high increase in strength for a liquid crystal display apparatus simultaneously by the configuration according to Japanese Patent Application Publication No. 2001-194649 and Japanese Utility Model Application Publication No. 1992-9090 mentioned above.

SUMMARY

An exemplary object of the present invention is to provide a liquid crystal display apparatus in which reduction in size, reduction in weight and high increase in strength are improved simultaneously by easy and cheap configuration. A liquid crystal display apparatus which stores a panel unit in an internal space formed by a front cover and a rear cover include a nail part which is formed on one of side panels of the front cover or the rear cover, and is perpendicular to a plate face of the side panel; and a hole part which is formed in a vicinity area of one of sides of the cover on which the nail part is not formed, and the nail part is inserted in.

BRIEF DESCRIPTION OF THE DRAWINGS

Exemplary features and advantages of the present invention will become apparent from the following detailed description when taken with the accompanying drawings in which:

FIG. 9 is a back view of a liquid crystal display apparatus according to the second embodiment of the present invention;

EXEMPLARY EMBODIMENTS

A First Embodiment

Figure 1:
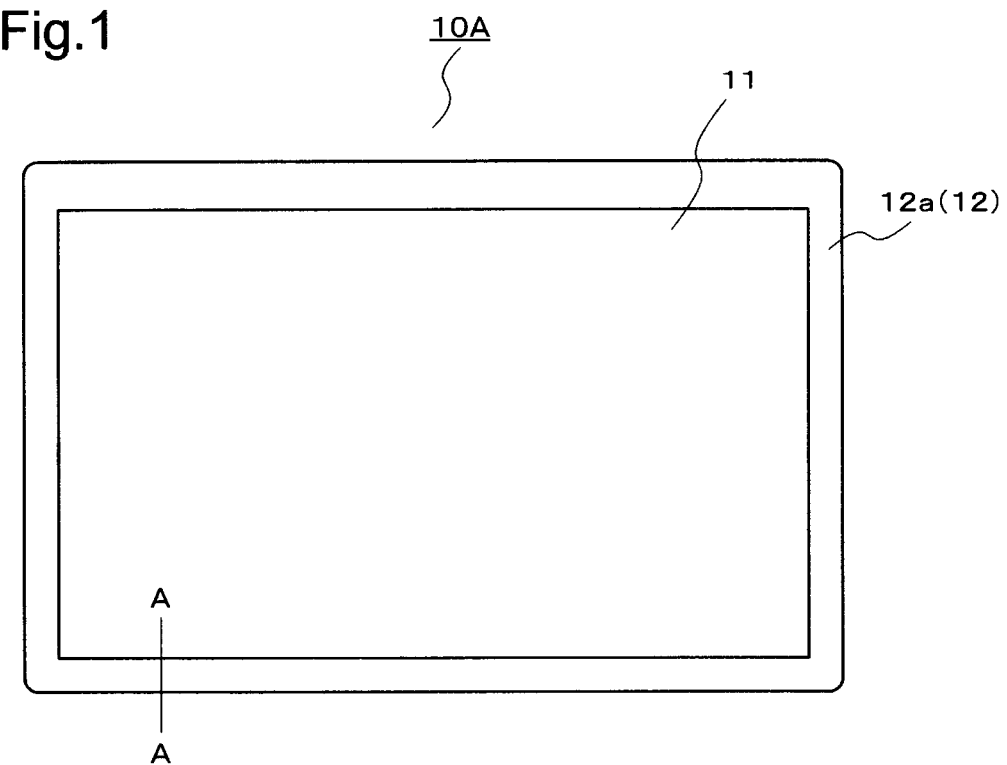
FIG. 1 is a front view of a liquid crystal display apparatus according to the first embodiment of the present invention.
Figure 2:
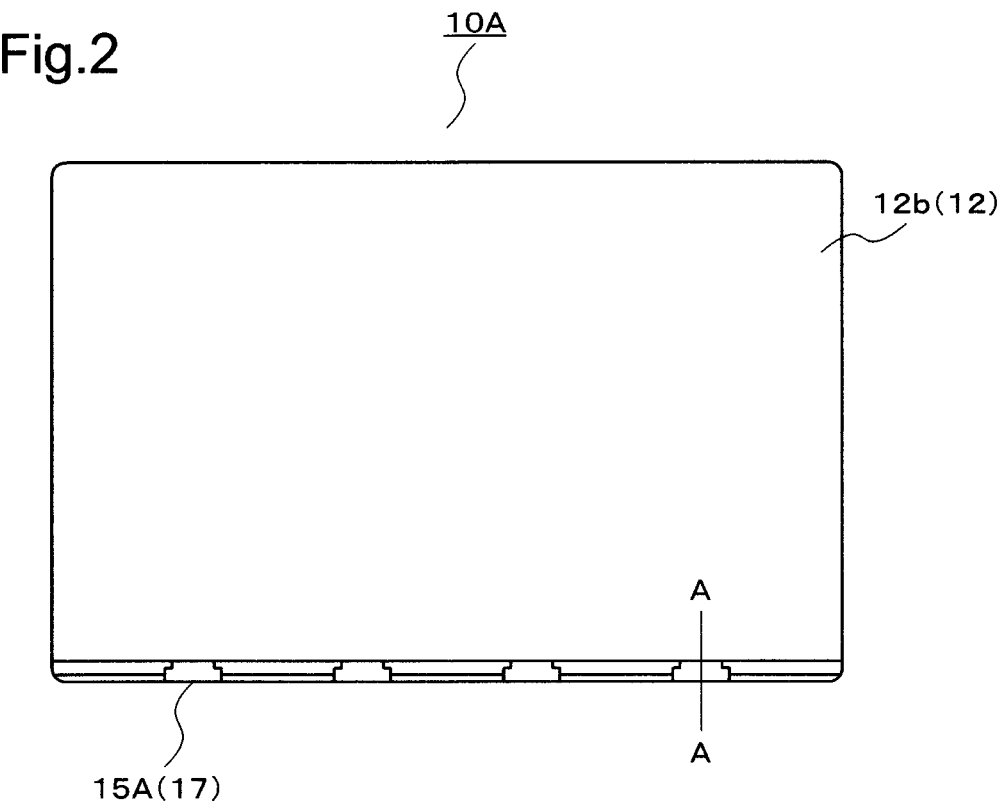
FIG. 2 is a back view of a liquid crystal display apparatus according to the first embodiment.
Figure 3:
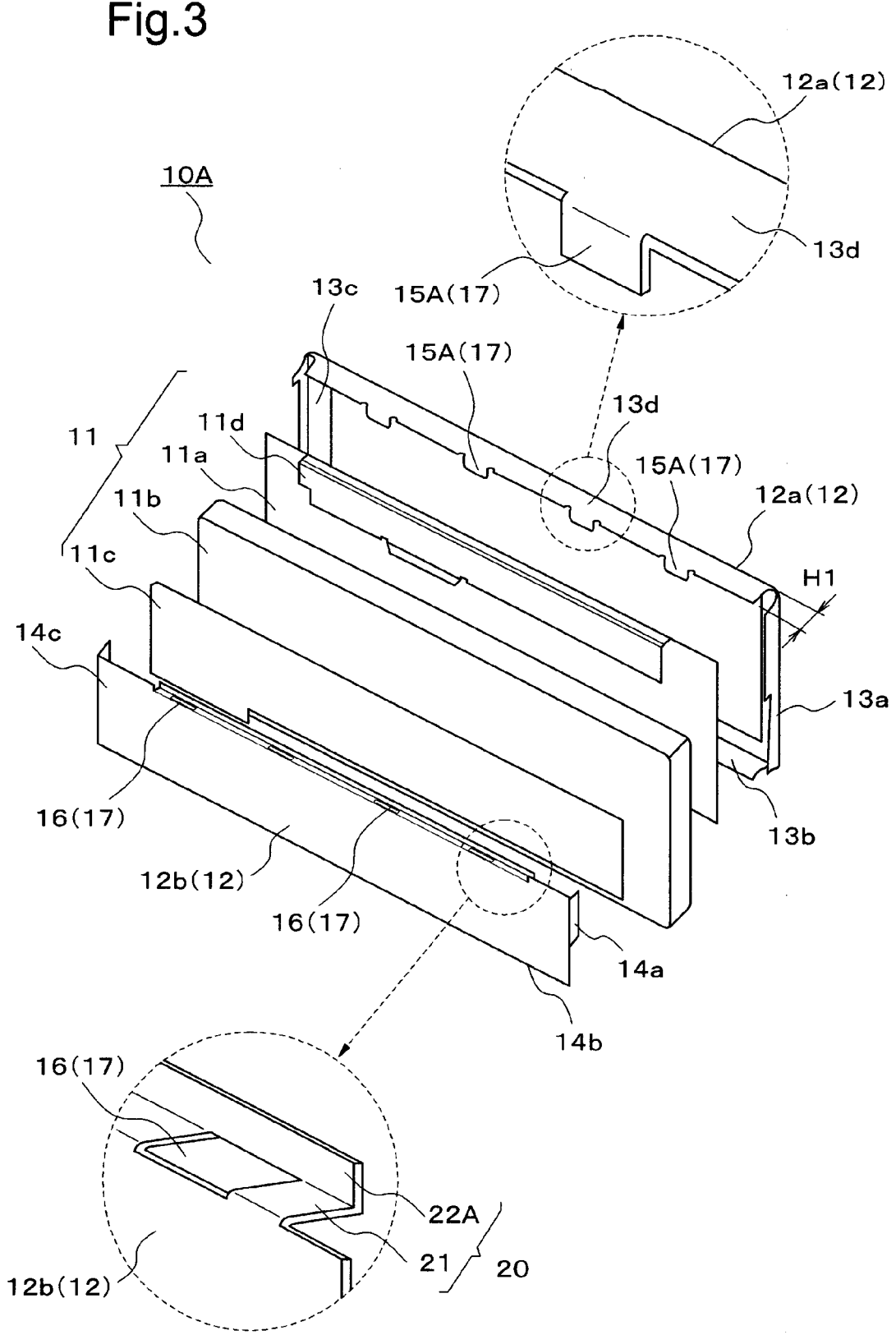
FIG. 3 is an exploded perspective view of a liquid crystal display apparatus according to the first embodiment.
Figure 4:
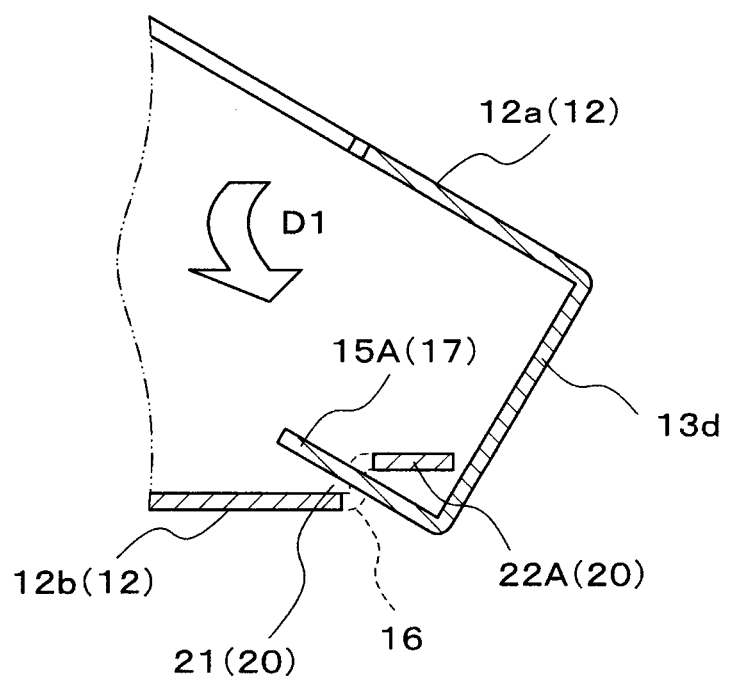
FIG. 4 is a figure illustrating an assembling method of a liquid crystal display apparatus according to the first embodiment.

The first embodiment of the present invention will be described. FIG. 1 is a front view of a liquid crystal display apparatus 10A according to the first embodiment, and FIG. 2 is the back view. FIG. 3 is an exploded perspective view of such liquid crystal display apparatus 10A. FIG. 4 is a fragmentary sectional view of the liquid crystal display apparatus in A-A line of FIG. 1 and FIG. 2, and is a figure illustrating an assembling method by engaging a front covering 12a and a rear covering 12b.

The liquid crystal display apparatus 10A includes a panel unit 11 and a cover 12 which stores this panel unit 11. The cover 12 includes the front cover 12a in a surface side of the panel unit 11 and the rear cover 12b in a rear side of the panel unit 11, and these are engaged by an engaging mechanism. In the following description, it will describe a case where each of the front cover 12a and the rear cover 12b is composed by a single member. However, the front cover 12a and the rear cover 12b may be composed by a plurality of members.

As shown in FIG. 3, the panel unit 11 includes a liquid crystal part 11a, a light source part 11b, a printed wiring board 11c and a panel FPC (Flexible Printed Circuits) 11d. The liquid crystal part 11a includes liquid crystal material and indicates a variety of information by controlling transmitted light. The light source part 11b is a source of light with which the liquid crystal part 11a is irradiated. The printed wiring board 11c is connected to the liquid crystal part 11a by the panel FPC 11d, connected to the light source part 11b by the light source FPC which is not illustrated, and includes electronic circuits for controlling these. Various configurations can be applied to the concrete composition of the liquid crystal part 11a, the light source part 11b, printed wiring board 11c and the panel FPC 11d or the like.

The front cover 12a and the rear cover 12b are made of the material including the aluminum and the stainless steel. Each of side panels 13a-13d is formed at each of four sides of the front cover 12a. The side panel 13d is equipped with a plurality of nail parts 15A. Also, each of side panels 14a-14c is formed at each of three sides of the rear cover 12b. At the rest of side of the rear cover 12b, each of hole parts 16 corresponding to each nail part 15A is formed. In below, an area of the side on which the hole part 16 is formed is called a vicinity area. Accordingly, when the nail part 15A is formed on the side panel 13d, this vicinity area is an area in the vicinity of the side of the rear cover 12b which is opposing to the side panel 13d. The nail part 15A is a stick-like member, and the hole part 16 is a through hole in which the nail part 15A is inserted. An engaging mechanism 17 is composed by the nail part 15A and the hole part 16.

The engaging mechanism 17 will be described in detail. As shown in FIG. 3, the height H1 of the side panel 13d of the front cover 12a corresponds to the height of the liquid crystal display apparatus 10A, and a plurality of nail parts 15A are formed on an edge portion of this side panel 13d. The nail part 15A is fabricated by bending and formed so that it may become approximately parallel to the surface (a face which is a panel surface of the liquid crystal display apparatus 10A) of the front cover 12a.

On the other hand, the vicinity area of the rear cover 12b is fabricated by bending into a step shape, and a step part 20 is formed in the vicinity area. The step part 20 includes a rising portion 21 and a terrace portion 22A, and the hole part 16 of the through hole is formed in the rising portion 21.

When such front cover 12a and rear cover 12b are engaged, as shown in FIG. 4, it moves the front cover 12a to the direction of the rear cover 12b while holding the front cover 12a being inclined. Then the nail part 15A is inserted into the hole part 16. At that time, the nail part 15A can be easily inserted into the hole part 16 because the terrace portion 22A functions as a guide plate for guiding the nail part 15A. After that, by rotating the front cover 12a in a direction of an arrow D1, the front cover 12a and the rear cover 12b are engaged.

Figure 5:
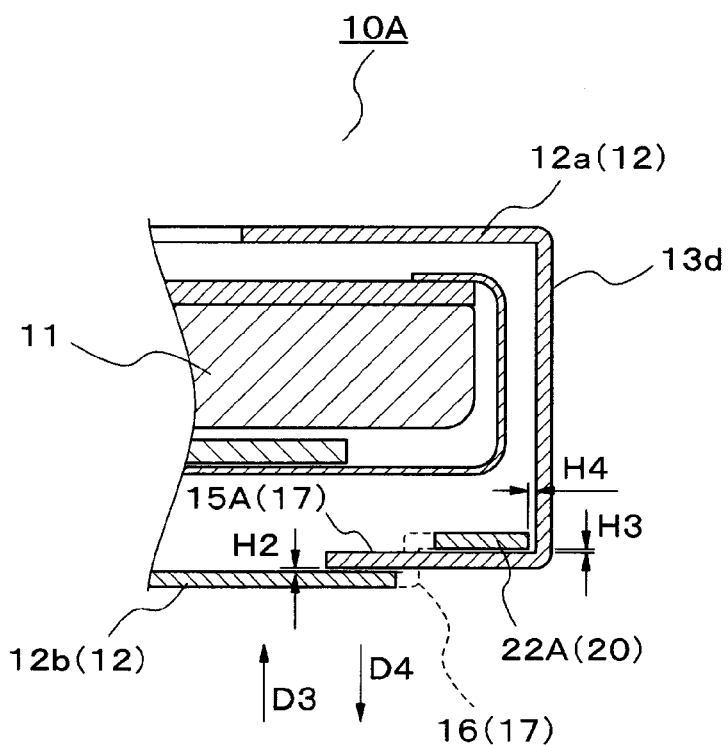
FIG. 5 is a fragmentary sectional view of a liquid crystal display apparatus in A-A line of FIG. 1 and FIG. 2.
Figure 26:
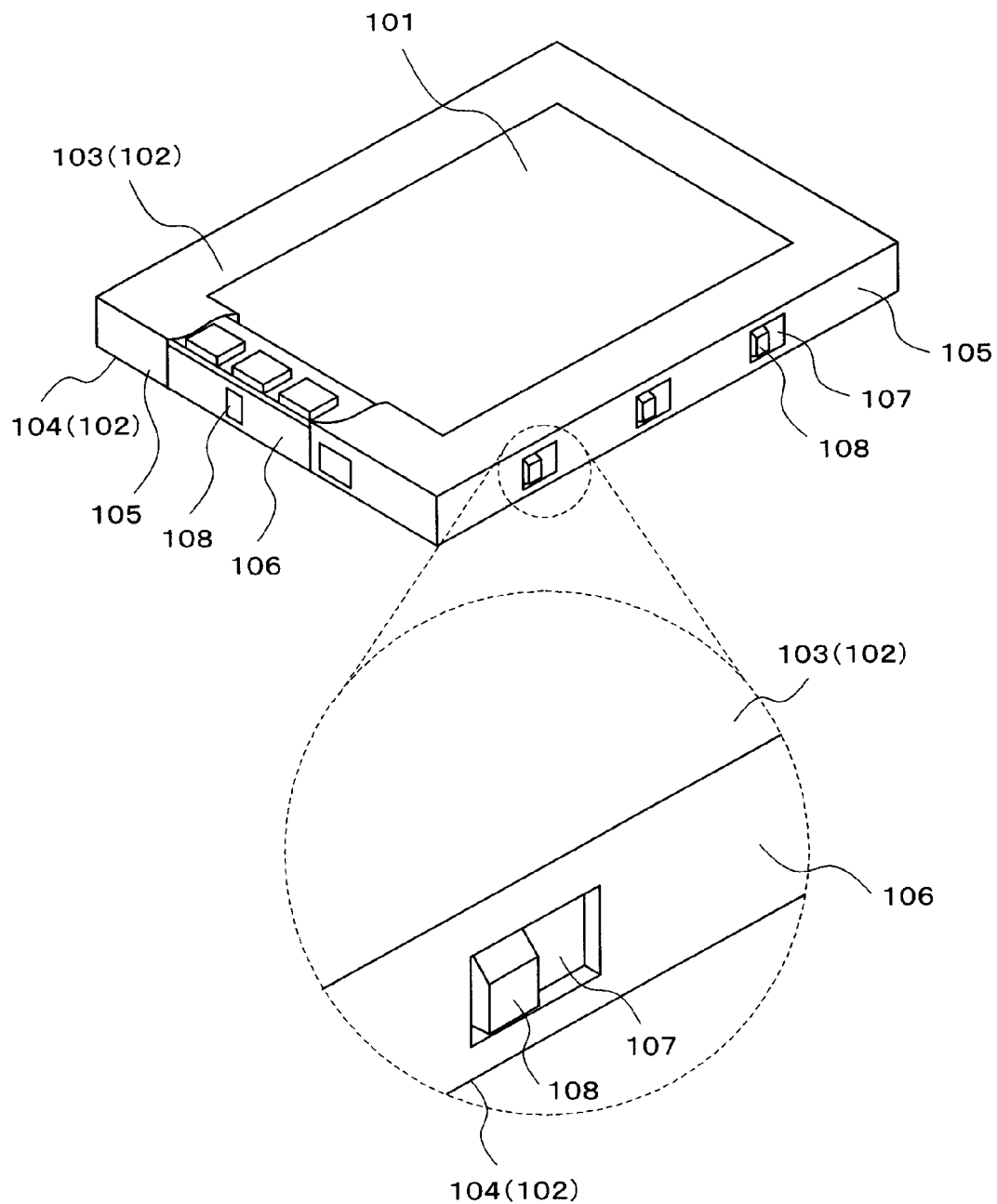
FIG. 26 is a perspective view of a liquid crystal display apparatus according to related art.
Figure 27:
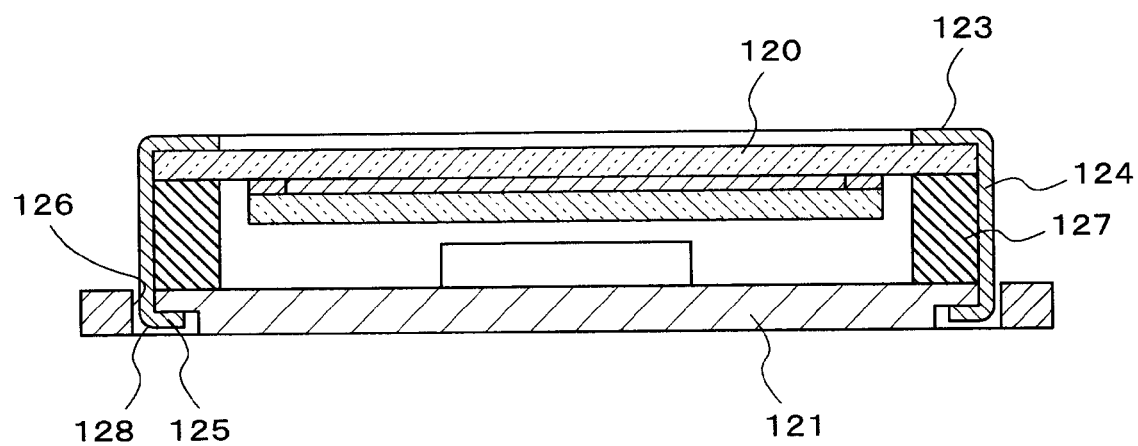
FIG. 27 is a cross section of a liquid crystal display apparatus according to another related art.

FIG. 5 is a fragmentary sectional view in A-A line of FIG. 1 and FIG. 2, and shows a state that the front cover 12a and the rear cover 12b are being engaged. As to it is apparent from FIG. 5, a thickness of the side panel 13d side of the liquid crystal display apparatus 10A is determined only by a thickness of this side panel 13d. Accordingly, when comparing with the liquid crystal display apparatus in which the side panel of the front cover and the side panel of the rear cover overlap as shown in FIG. 26, it becomes possible to reduce in size by the thickness of one side panel 13d and to reduce weight by the weight of one omitted side panel for the liquid crystal display apparatus 10A according to this embodiment.

Further, as shown in FIG. 5, a gap H2 between the nail part 15A and the rear cover 12b, a gap H3 between the nail part 15A and the terrace portion 22A and a gap H4 between an end face of the terrace portion 22A and the side panel 13d are set to the minimum size respectively. By this, a backlash at the nail part 15A inserted into the hole part 16 can be suppressed.

Also, when the nail part 15A is inserted into the hole part 16, a tip area of the nail part 15A touches the rear cover 12b and a base area of the nail part 15A comes to touch the terrace portion 22A. As a result, when an external force in a direction of an arrow D3 (a force that pushes the rear cover 12b towards the direction of the panel unit 11) has worked on the rear cover 12b, the rear cover 12b and the nail part 15A cooperate to counteract the external force. That is, the nail part 15A functions so as to increase the strength of the rear cover 12b against the external force in the direction of the arrow D3. Also, when an external force in a direction of an arrow D4 (a force that pulls the rear cover 12b from the panel unit 11 side) has worked on the rear cover 12b, the terrace portion 22A and the nail part 15A cooperate to counteract the external force. That is, the terrace portion 22A functions so as to increase the strength of the rear cover 12b against the external force in the direction of the arrow D4.

Figure 6:
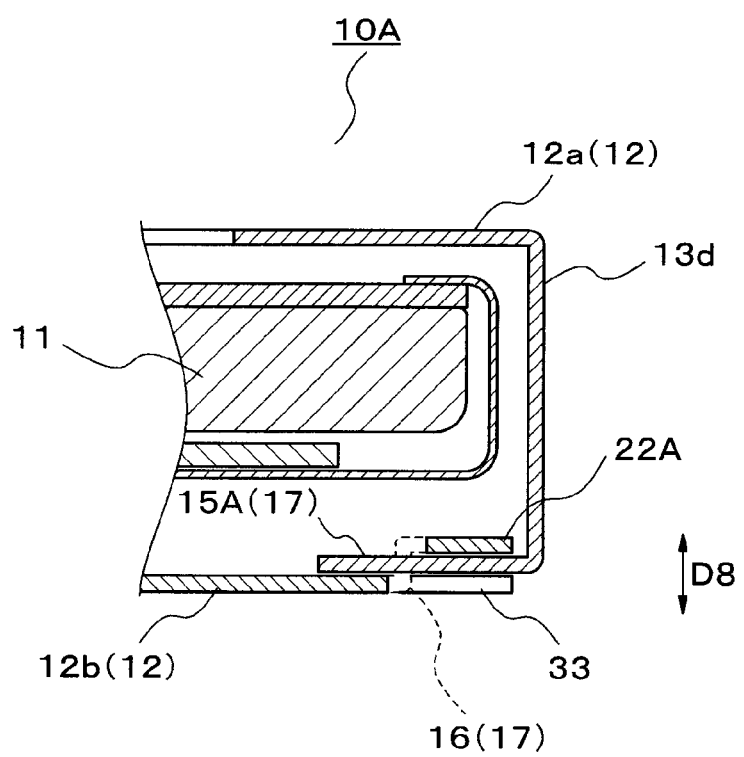
FIG. 6 is a cross sectional view corresponding to an area in A-A line of FIG. 1 and FIG. 2, and is a fragmentary sectional view of a liquid crystal display apparatus equipped with a step part partially.
Figure 7:
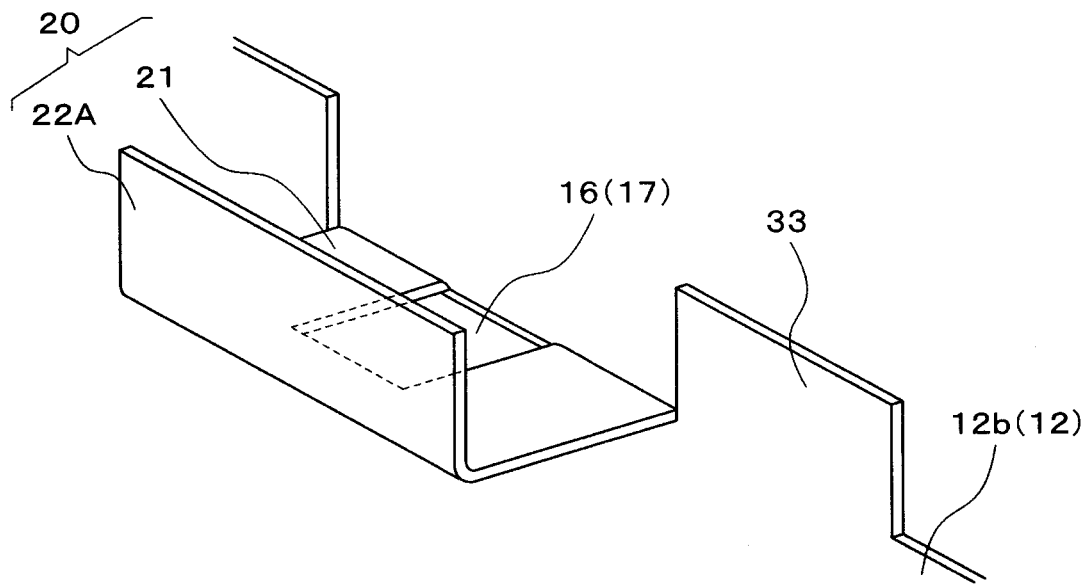
FIG. 7 is a fragmentary perspective view of a rear cover of the liquid crystal display apparatus in FIG. 6.

In the above-mentioned description, with reference to FIG. 3, it has been described about a case where the step part 20 is formed over the whole area of the vicinity area of the rear cover 12b, however this embodiment is not limited to such a configuration. For example, as shown in FIG. 6 and FIG. 7, the step part 20 may be formed only around the hole part 16. Further, FIG. 6 indicates a cross section of the liquid crystal display apparatus corresponding to an area of A-A line of FIG. 1, and FIG. 7 is a fragmentary perspective view of the rear cover 12b having the step part 20.

In FIG. 6 and FIG. 7, the number 33 indicates an area of the rear cover 12b which is not fabricated by bending into a step shape. Hereinafter, this area is described as a peak portion 33. By such a configuration, because the nail part 15A locates between the terrace portion 22A and the peak portion 33, the strength of the liquid crystal display apparatus 10A against the external force of a thickness direction (the direction of an arrow D8 in FIG. 6) is improved.

Figure 8:
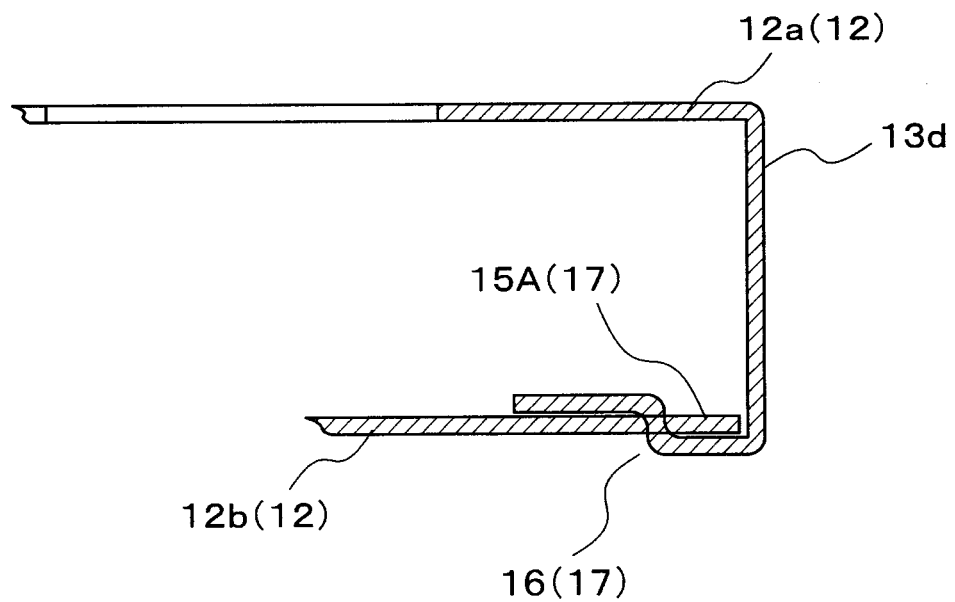
FIG. 8 is a cross sectional view corresponding to an area in A-A line of FIG. 1 and FIG. 2, and is a fragmentary sectional view of a liquid crystal display apparatus in which each of the formed positions of a nail part and a hole part is changed each other.

Also, in the above-mentioned description, it has been described about a case where the hole part 16 is formed on the rear cover 12b side and the nail part 15A is formed on the front cover 12a side, however this embodiment is not limited to this, and as shown in FIG. 8, for example, it may form the hole part 16 on the front cover 12a and form the nail part 15A on the rear cover 12b. The same operational effect can be obtained in any configurations.

As described above, because the engaging mechanism which joins the front cover and the rear cover together is composed by the nail part and the hole part, reduction in size, reduction in weight and high increase in strength for the liquid crystal display apparatus can be improved non-selectively by easy and cheap configuration.

A Second Embodiment

Next, the second embodiment of the present invention will be described. The description about the same configuration as the first embodiment will be omitted appropriately by using an identical number. In this embodiment, a stopping mechanism is equipped so that the nail part is prevented from being pulled out easily from the hole part.

Figure 10A:
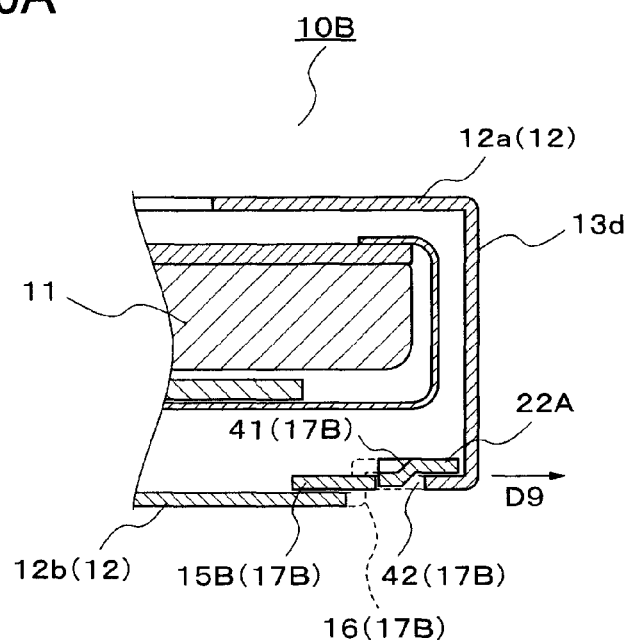
FIG. 10A is a fragmentary sectional view of a liquid crystal display apparatus in B-B line of FIG. 9 according to the second embodiment.
Figure 10B:
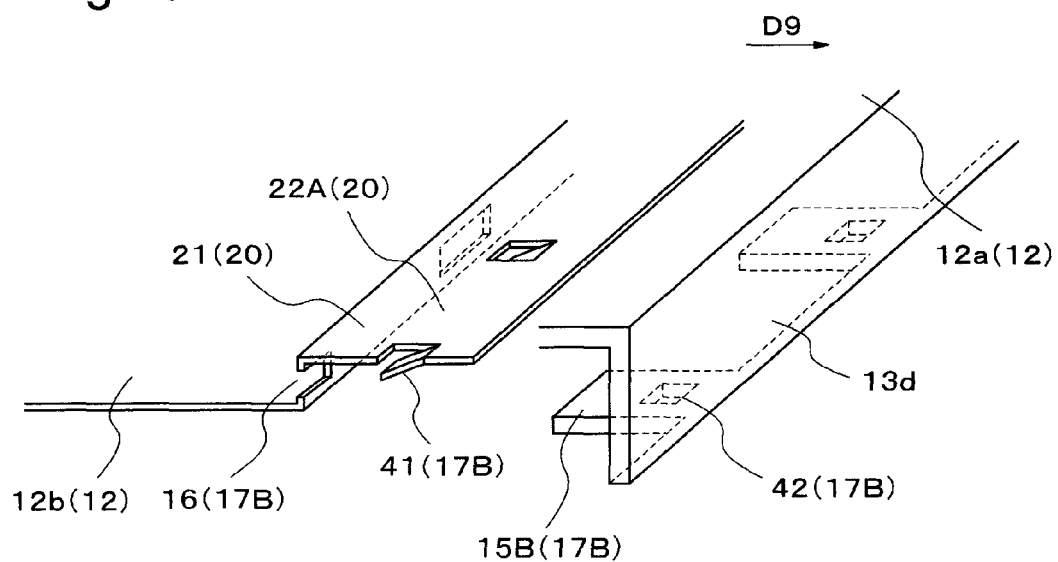
FIG. 10B is a fragmentary perspective view of a front cover in which a stopper hole is formed in a nail part and a rear cover in which a stopper nail is formed on a terrace portion according to the second embodiment.

FIG. 9 is a back view of a liquid crystal display apparatus 10B according to this embodiment. FIG. 10A is a cross section in B-B line of FIG. 9, and FIG. 10B is a fragmentary perspective view of the front cover 12a and the rear cover 12b for illustrating an engaging mechanism 17B.

The engaging mechanism 17B includes a nail part 15B formed on the front cover 12a and the hole part 16 formed on the rear cover 12b. The nail part 15B forms a stopper hole 42 and a terrace portion 22A forms a stopper nail 41. It may form the stopper nail 41 in the nail part 15B and may form the stopper hole 42 in the terrace portion 22A.

As a result, when the nail part 15B is inserted into the hole part 16, the nail part 15B is being inserted through the hole while making the stopper nail 41 deform elastically. And, when the nail part 15B has been inserted and reached a predetermined position, the stopper nail 41 restores by elastic force and falls into the stopper hole 42. Accordingly, even if external force in a direction of an arrow D9 which pulls the nail part 15B out of the hole part 16 has worked on the front cover 12a, the nail part 15B is prevented from being pulled out by contact of the stopper nail 41 and the stopper hole 42. Therefore, the reliability of the engagement state of the front cover 12a and the rear cover 12b improves.

A Third Embodiment

Next, the third embodiment of the present invention will be described. Further, the description about the same configuration as the first embodiment will be omitted appropriately by using an identical number. In each previous embodiment, the terrace portion of the step part formed on the rear cover is arranged to parallel to a main surface of the rear cover. In contrast, the terrace portion according to this embodiment is arranged so as to have a predetermined angle to a main surface of the rear cover.

Figure 11:
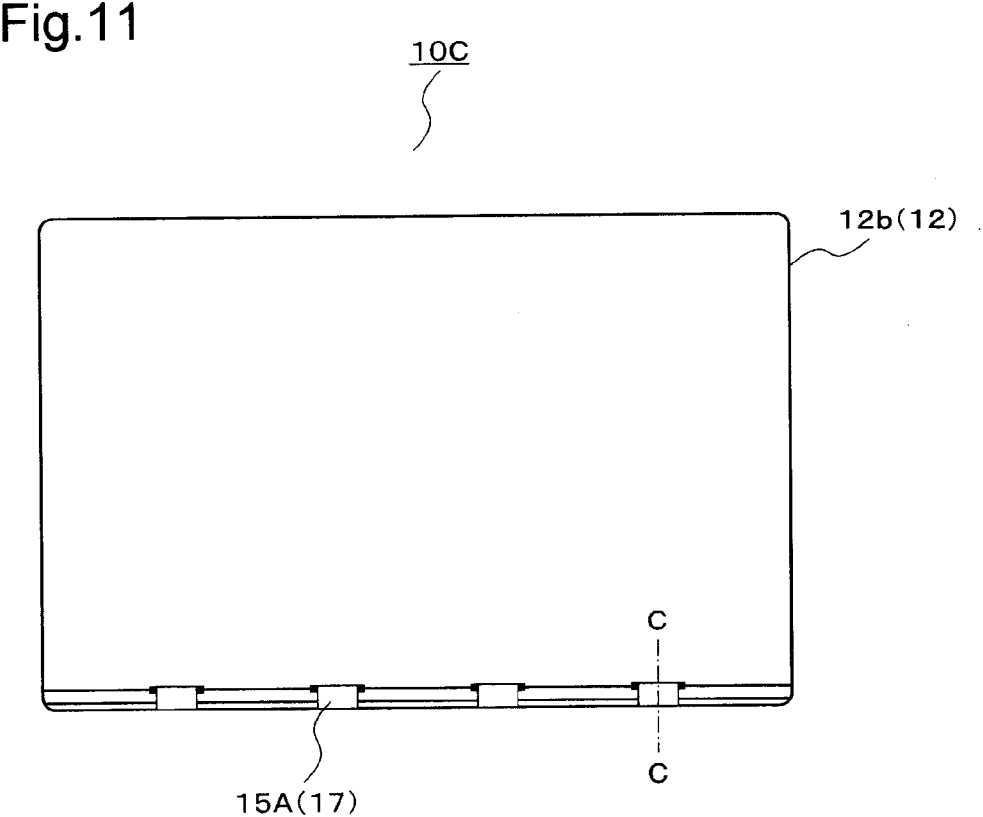
FIG. 11 is a back view of a liquid crystal display apparatus according to the third embodiment of the present invention.
Figure 12:
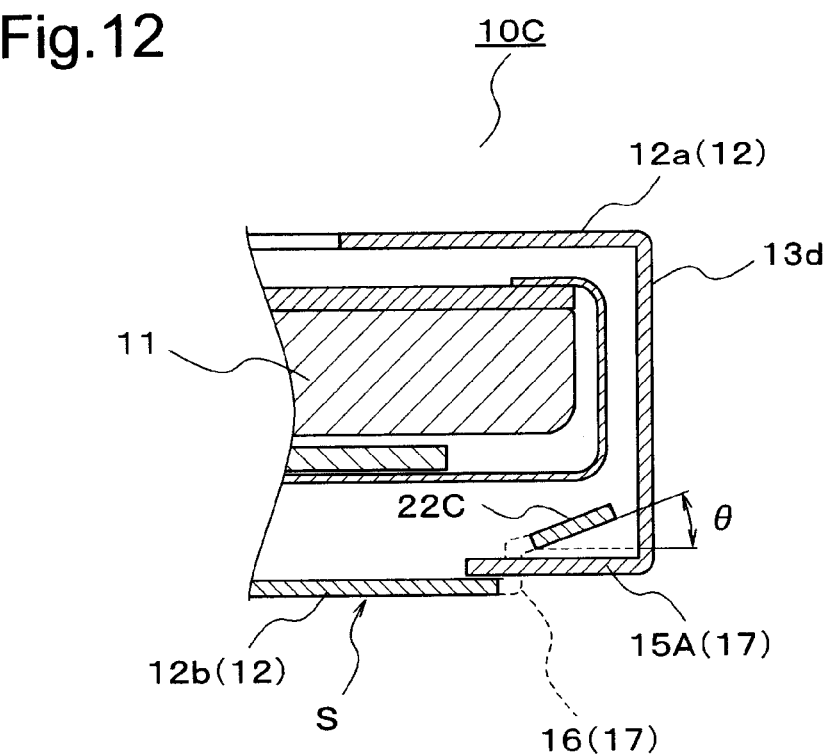
FIG. 12 is a fragmentary sectional view of a liquid crystal display apparatus in C-C line of FIG. 11.
Figure 13:
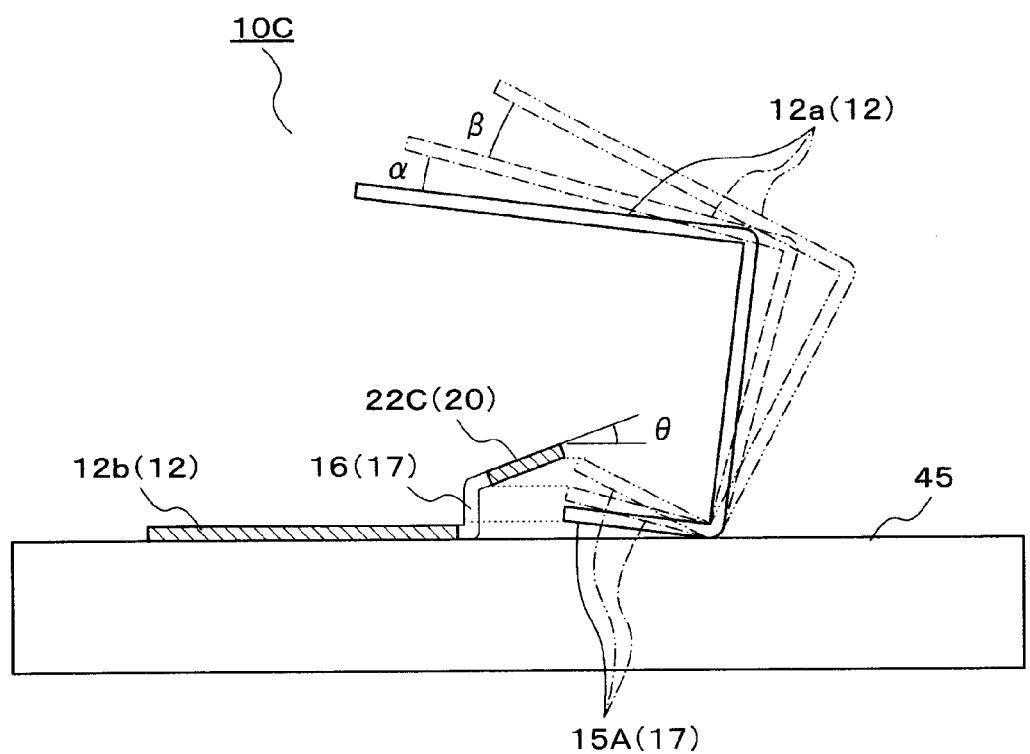
FIG. 13 is a figure illustrating a function when inclines a terrace portion according to the third embodiment.

FIG. 11 is a back view of a liquid crystal display apparatus 10C according to this embodiment. FIG. 12 is a fragmentary sectional view of the liquid crystal display apparatus 10C in C-C line of FIG. 11. FIG. 13 is a figure illustrating an engaging method of the front cover 12a and the rear cover 12b.

Figure 14:
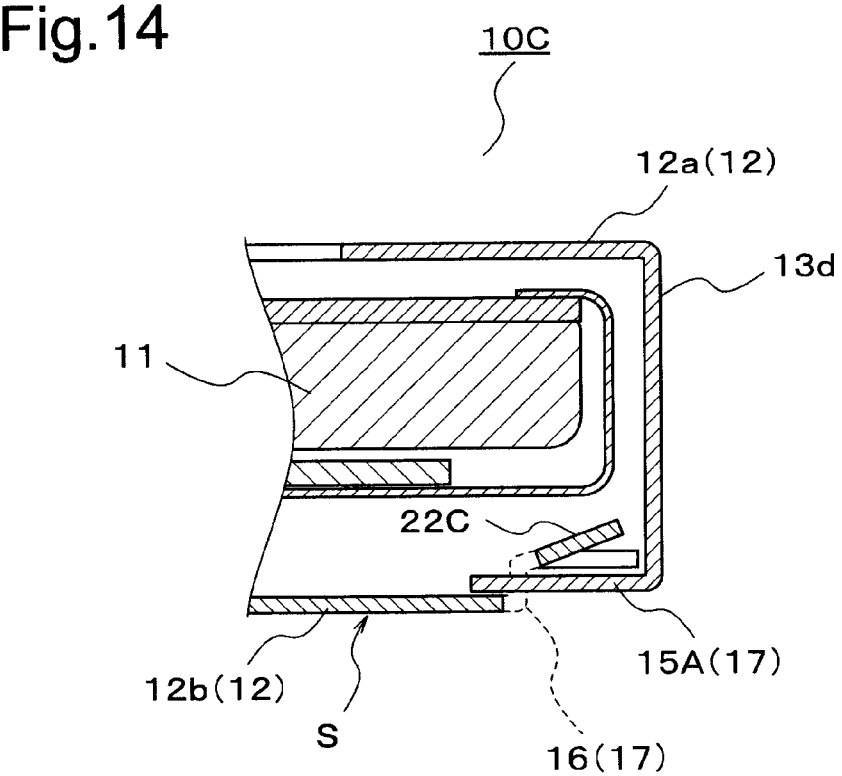
FIG. 14 is a fragmentary sectional view of a liquid crystal display apparatus which partially inclines a terrace portion according to the third embodiment.

As it is apparent from FIG. 12, the terrace portion 22C inclines at the predetermined angle θ to a main surface S of the rear cover 12b which is a back surface of the liquid crystal display apparatus 10C. As shown in FIG. 14, it may be the terrace portion 22C in which only an area corresponding to the hole part 16 is inclined. That is, in FIGS. 11-13, the terrace portion 22C is arranged so as to incline whole area of the vicinity area of the rear cover 12b, however, it may be the terrace portion 22C in which only around the hole part 16 is inclined as shown in FIG. 14.

A reason why the terrace portion 22C is inclined like this will be described with reference to FIG. 13. When the front cover 12a and the rear cover 12b are engaged, the rear cover 12b is placed on a workbench 45. In this state, the front cover 12a being inclined is moved closer to the rear cover 12b, and the nail part 15A is inserted into the hole part 16.

At that time, if the terrace portion 22C is formed to be parallel to a main surface S of the rear cover 12b, an allowable range of an inclination angle of the front cover 12a becomes small. In previous description, with reference to FIG. 5, it was stated to suppress a backlash in the nail part inserted into the hole part by setting the gap H2 between the nail part and the rear cover and the gap H3 between the nail part and the terrace portion to the minimum size. Accordingly, in this case, the allowable range of an inclination angle of the front cover 12a becomes small. The allowable range of an inclination angle is small means that the engaging work of the front cover 12a and the rear cover 12b becomes difficult. However, by inclining the terrace portion 22C as shown in FIG. 13, the range of an inclination angle allowed to the front cover 12a can be made wide.

The angle α between the front cover 12a drawn by a solid line and the front cover 12a drawn by a dashed dotted line in FIG. 13 indicates an inclination angle allowed to the front cover when the terrace portion is formed to be parallel to a main surface of the rear cover. To set a gap between the nail part and the rear cover and a gap between the nail part and the terrace portion to the minimum size in order to suppress a backlash in the nail part inserted into the hole part is equivalent to make this angle α small.

On the other hand, when the terrace portion 22C is inclined, the range of the inclination angle allowed to the front cover 12a will be α+β. That is, it can make the range of the inclination angle allowed to the front cover 12a larger by the angle β. And, when the inclination angle of the front cover 12a is made γ, the nail part 15A touches the terrace portion 22C and is guided to be inserted into the hole part 16 at the range of α<=γ<=β. Accordingly, it can make the range of the inclination angle allowed to the front cover 12a large, and the engaging work of the front cover 12a and the rear cover 12b becomes easy. When the terrace portion 22C is inclined, only an area where the nail part 15A touches (an area which guides the nail part 15A) may be inclined, and it is not necessary to incline all areas of the terrace portion 22C.

Figure 15:
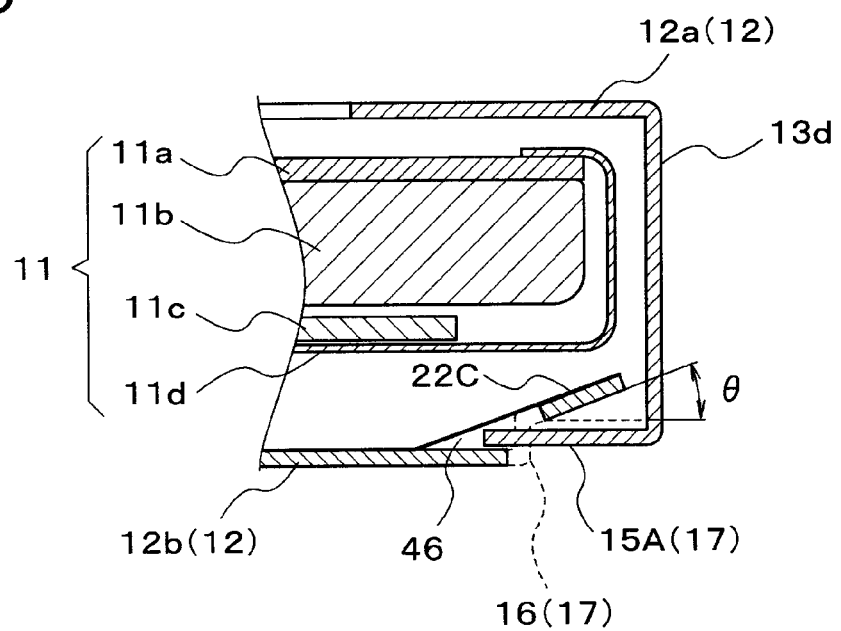
FIG. 15 is a fragmentary sectional view of a liquid crystal display apparatus equipped with an insulation sheet according to the third embodiment.

By the way, when the nail part 15A is inserted into the hole part 16, it is worried that a tip part of the nail part 15A touches the panel FPC 11d. In particular, as mentioned above, when the range of the inclination angle allowed to the front cover 12a is large, contact of the tip part of the nail part 15A and the panel FPC 11d is worried. In such case, as shown in FIG. 15, it is desirable to install an insulation sheet 46 with electric insulating characteristics between the panel FPC 11d and the rear cover 12b, and prevent contact of the tip part of the nail part 15A and the panel FPC 11d.

Figure 16:
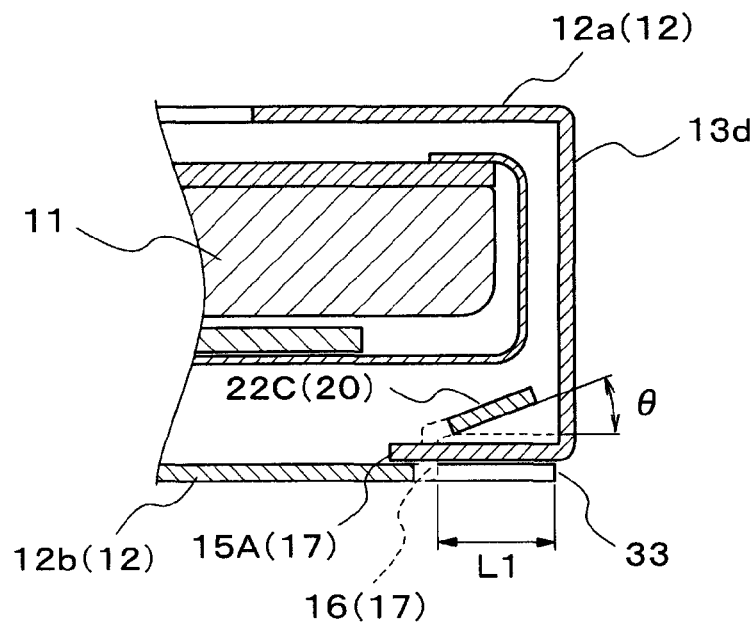
FIG. 16 is a fragmentary sectional view of a liquid crystal display apparatus equipped with a step part partially according to the third embodiment.
Figure 17:
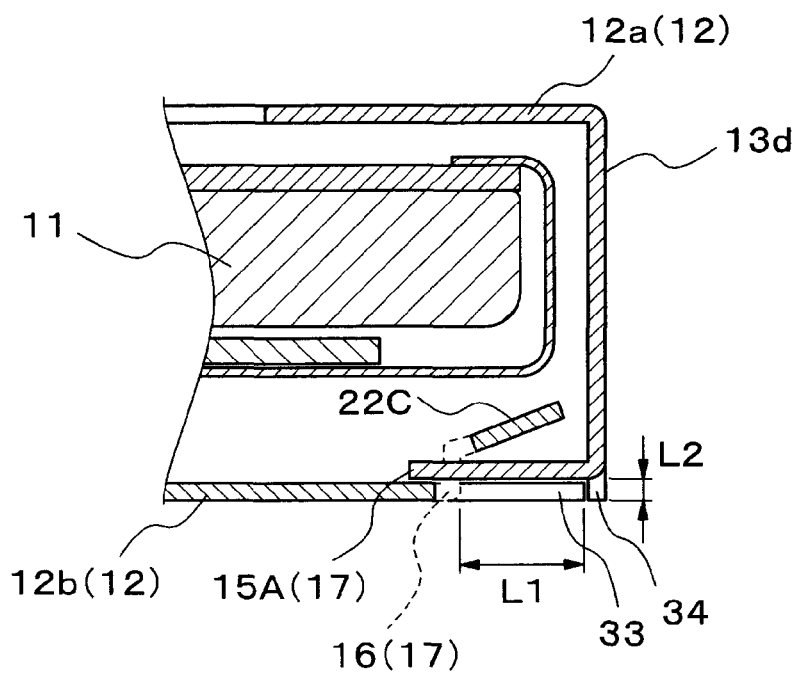
FIG. 17 is a fragmentary sectional view of a liquid crystal display apparatus equipped with a peak covering part which covers a peak portion according to the third embodiment.
Figure 18:
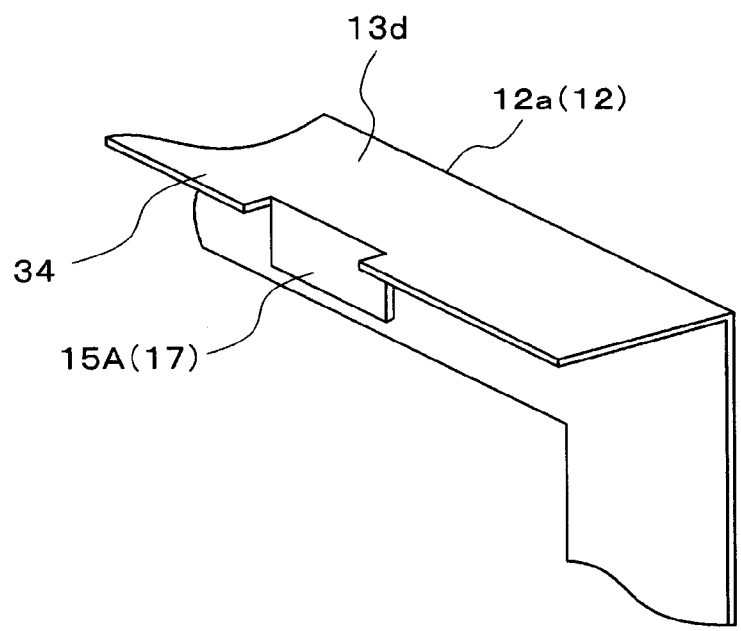
FIG. 18 is a fragmentary perspective view of a front cover according to the third embodiment.

Also, in this embodiment, as shown in FIG. 16, the step part 20 can be formed only on the vicinity area which is opposing to the nail part 15A. In this case, deformation of the peak portion 33 is worried by external force because it becomes a state that an end face of the peak portion 33 exposes and the length L1 of the peak portion 33 is long. In such a case, as shown in FIG. 17 and FIG. 18, the side panel 13d other than the area where the nail part 15A being bent is protruded by the length L2 which is corresponding to the thickness of the peak portion 33. In FIG. 17 and FIG. 18, a side panel part which is protruding from the nail part 15A is indicated by the number 34. Hereinafter, this area is described as a peak covering part 34.

The peak covering part 34 functions to reduce an area where the external force is added to the peak portion 33 as mentioned above. In this case, it is worried that the peak covering part 34 is deformed by the external force. However, amount of deformation of the peak covering part 34 and the side panel 13d by the external force is small because the length L2 of the peak covering part 34 is the size equivalent to the thickness of the side panel 13d, and this size is small (L2<=L 1). Because the nail part 15A neighboring the peak covering part 34 functions as a rib, the strength of the peak covering part 34 and the side panel 13d improves.

A Fourth Embodiment

Next, the fourth embodiment of the present invention will be described. The description about the same configuration as the first embodiment will be omitted appropriately by using an identical number. This embodiment relates to a configuration which prevents an insertion backlash when the nail part has been inserted into the hole part.

Figure 19:
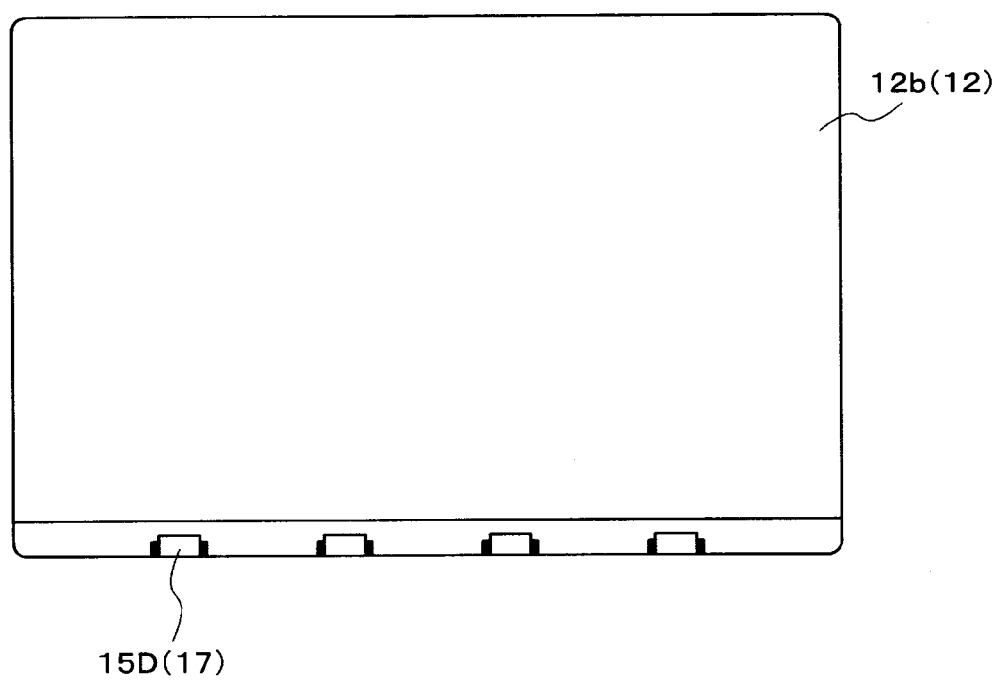
FIG. 19 is a back view of a liquid crystal display apparatus according to the fourth embodiment of the present invention.
Figure 20:
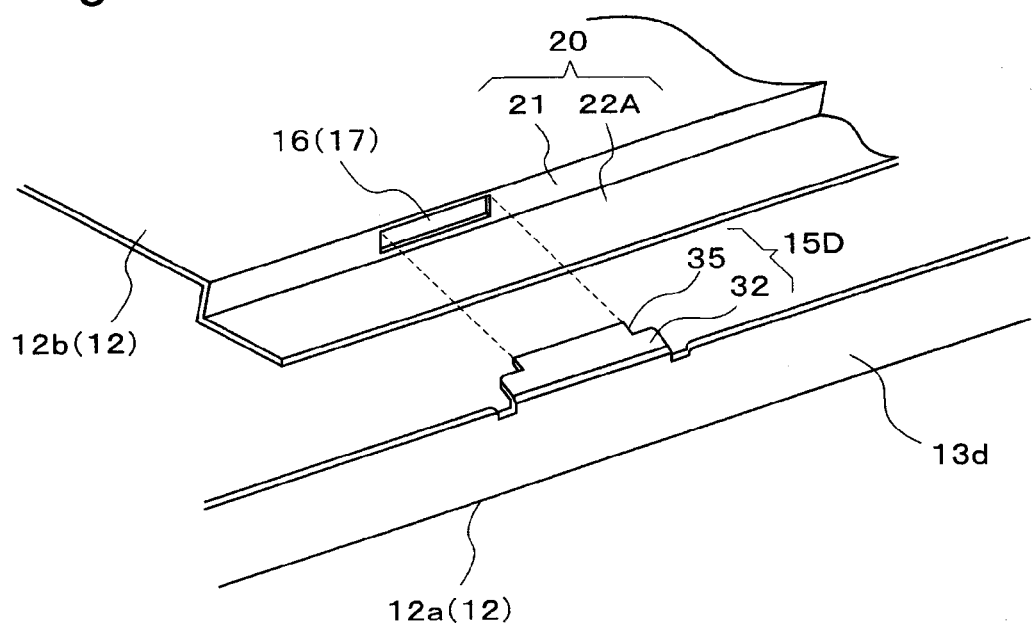
FIG. 20 is a fragmentary perspective view of a front cover and a rear cover according to the fourth embodiment.

FIG. 19 is a back view of a liquid crystal display apparatus 10D according to this embodiment having such a nail part 15D. FIG. 20 is an enlarged drawing of the front cover 12a and the rear cover 12b in the vicinity of the nail part 15D. In below, the term of "width" is used, and this "width" means length of a longitudinal direction of the hole part 16 formed on the rear cover 12b as shown in FIG. 20.

The width of the nail part described up to now has been formed into the uniform size. Accordingly, when the nail part is inserted into the hole part, it is possible to be inserted to the base of the nail part. In contrast, the nail part 15D of this embodiment is formed so that the width of the base area of the nail part 15D is larger than the width dimension of the hole part 16. As a result, the insertion amount of the nail part 15D is limited.

As it is apparent from FIG. 20, the nail part 15D includes a nail insert part 35 which is a nail tip and a pent roof part 32 which is a nail base. The width dimension of the nail insert part 35 is set to appropriately smaller size than the width dimension of the hole part 16 so that the nail insert part 35 can be inserted into the hole part 16 and the backlash in the width direction may become small after inserted.

On the other hand, the width dimension of the pent roof part 32 is set to the size larger than the width dimension of the hole part 16. Accordingly, when the nail part 15D is inserted into the hole part 16, the nail part 15D is being inserted until the pent roof part 32 touches the rising portion 21 of the step part 20. Because the front cover 12a and the rear cover 12b are made by a board whose material is the aluminum or the like, it has large elasticity relatively.

Accordingly, the side panel 13d or the step part 20 has a slight amount of elastic deformation by the power when the pent roof part 32 touches the rising portion 21, and contacting state of the pent roof part 32 and the rising portion 21 is held by this elastic deformed state being kept. The backlash of the nail part 15D in the nail part insertion direction is suppressed by this.

In the above-mentioned description, it has been described about a case where the pent roof part is formed on each of shoulders (left and right) of the nail part, however the pent roof part may be formed on only one of shoulders. Also, it is not necessary to form the pent roof part on all of the nail parts, and for example, it may be a configuration that the pent roof part is formed on every other nail part among a plurality of nail parts.

Figure 21:
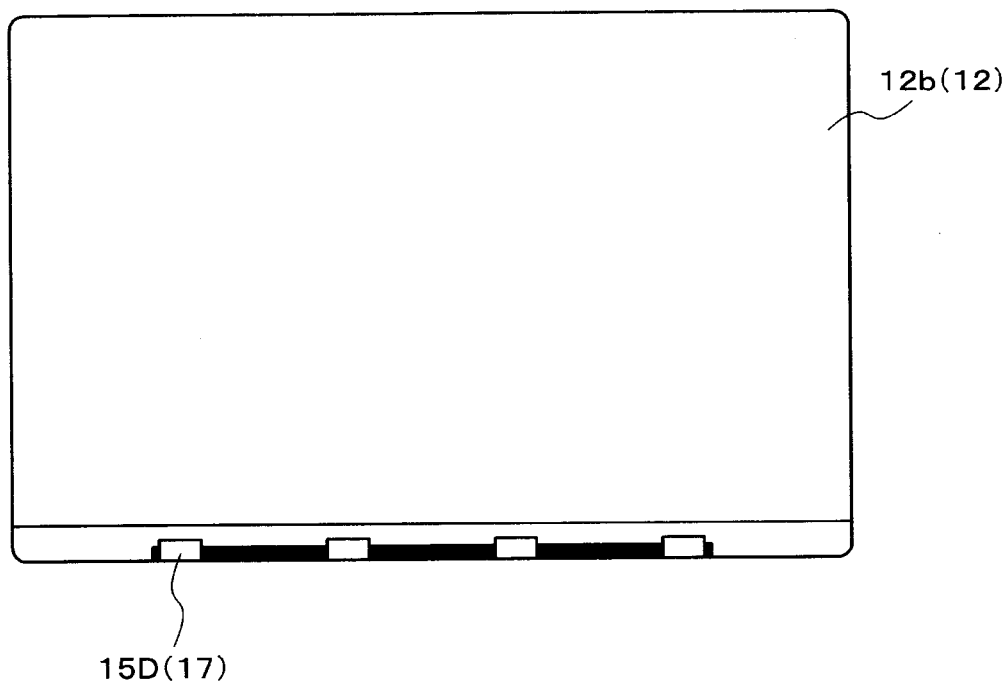
FIG. 21 is a back view of a liquid crystal display apparatus of other configurations according to the fourth embodiment.
Figure 22:
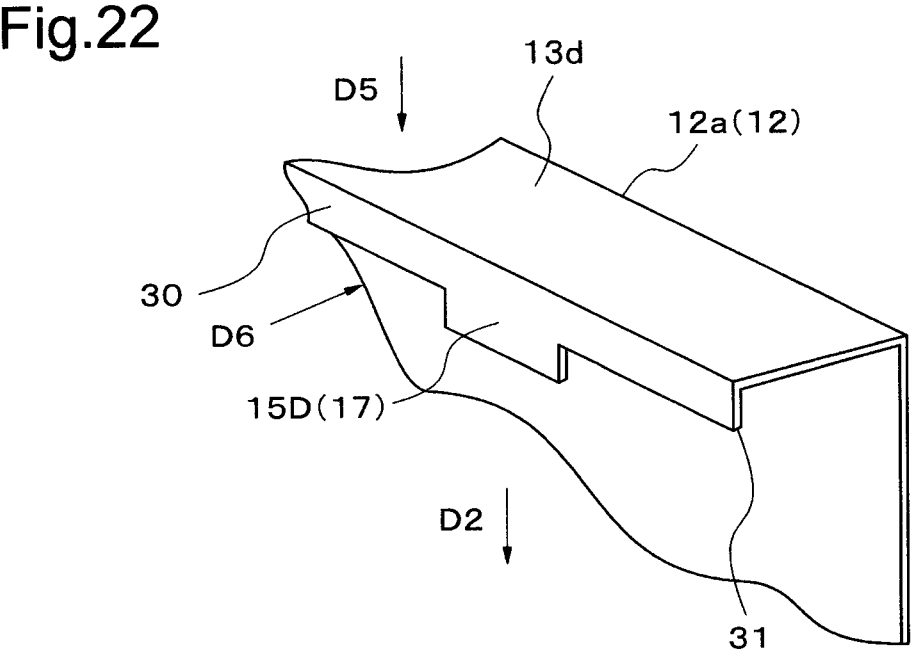
FIG. 22 is a fragmentary perspective view of a front cover of a liquid crystal display apparatus in FIG. 21.

Further, in the previous description, it has been described about a case where the nail part is bent along an edge of the side panel, however the nail part may be bent in the area which appropriately includes an edge part of the side panel as shown in FIG. 21 and FIG. 22. FIG. 21 is a back view of the liquid crystal display apparatus 10D which indicates an area where appropriately includes an edge part of the side panel 13*d* being bent. FIG. 22 is a fragmentary perspective view of the front cover 12*a* which indicates the end structure of the side panel 13*d*.

As shown in FIG. 22, the area which is formed by appropriately bending an edge part of the side panel 13*d* is indicated in the number 30. This area is equivalent to the pent roof part 30 mentioned above. By forming such pent roof part 30, when the nail part 15D is inserted into the hole part 16, an end face 31 of the pent roof part 30 touches the rising portion 21, and the insertion amount of the nail part 15D is limited, and as the result, the backlash in the insertion direction D2 of the front cover 12*a* to the rear cover 12*b* can be prevented.

Also, the pent roof part 30 functions as a rib which suppresses deformation of the side panel 13*d* even if the external force works on the side panel 13*d* in the direction of an arrow D5 of FIG. 22. Similarly, the side panel 13*d* functions as a rib which suppresses deformation of the pent roof part 30 even if the external force works on the pent roof part 30 in the direction of an arrow D6. Accordingly, because the side panel 13*d* and the pent roof part 30 function as a rib each other, improvement in the strength becomes possible.

A Fifth Embodiment

Next, the fifth embodiment of the present invention will be described. The description about the same configuration as the first embodiment will be omitted appropriately by using an identical number. In the assembling method of the front cover and the rear cover, the front cover which is held being inclined is moved closer to the rear cover which is placed on a workbench, and the nail part is inserted into the hole part. At that time, it is desirable that the nail part can be inserted into the hole part smoothly.

Figure 23:
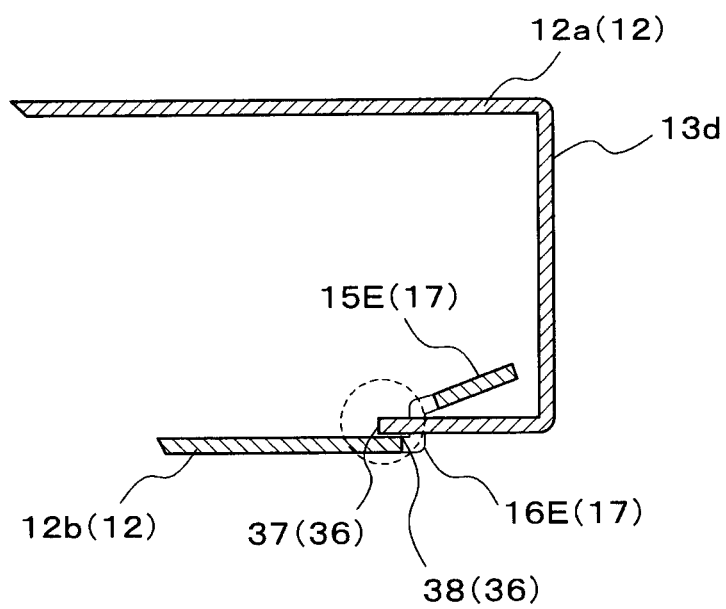
FIG. 23 is a fragmentary sectional view of a liquid crystal display apparatus according to the fifth embodiment of the present invention.

Accordingly, in this embodiment, a tapered part 36 is formed on the nail part 15E and the hole part 16E as shown in FIG. 23 so that these can be engaged smoothly. FIG. 23 is a fragmentary sectional view of the front cover 12*a* and the rear cover 12*b* which illustrating an engaging state of the nail part 15E and the hole part 16E.

The tapered part 36 is composed by a nail tapered part 37 which is formed on a tip side of the nail part 15E and is formed roundly at a corner of the rear cover 12*b* side, and a hole tapered part 38 which is formed on the hole part 16E.

Figure 24:
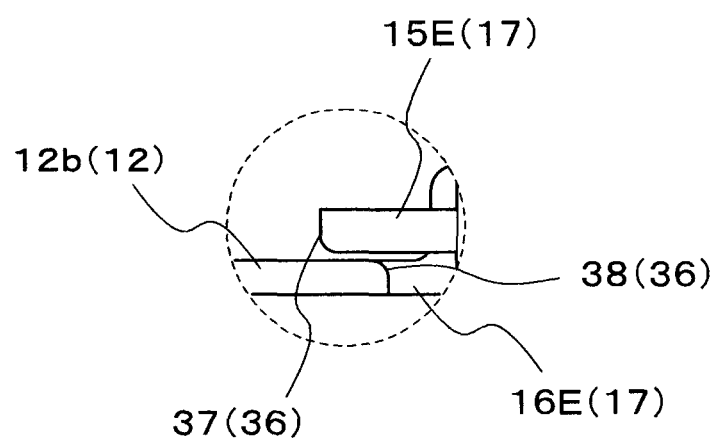
FIG. 24 is a partial enlarged sectional view of a liquid crystal display apparatus provided with a side face having a round-shaped tapered part according to the fifth embodiment.
Figure 25:
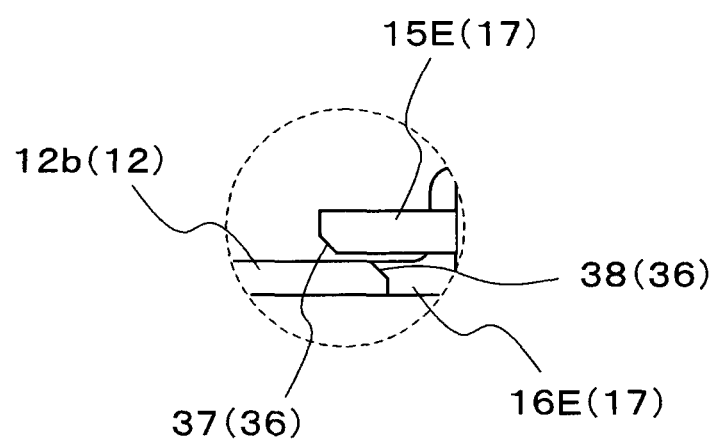
FIG. 25 is a partial enlarged sectional view of a liquid crystal display apparatus provided with a side face having a planar-shaped tapered part according to the fifth embodiment.

As the shape of the tapered part 36, a configuration shown in FIG. 24 or FIG. 25 can be illustrated as an example. FIG. 24 and FIG. 25 are enlarged drawings corresponding to an area of the dotted line ring in FIG. 23. FIG. 24 indicates a case where the shape of the side of the tapered part 36 is a round shape, and FIG. 25 indicates a case of planar shape. The tapered part 36 having any shape makes assembly work easy because the nail part 15E is guided smoothly to the hole part 16E when the nail part 15E is inserted into the hole part 16E.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. A liquid crystal display apparatus which stores a panel unit in an internal space formed by a front cover and a rear cover comprising:
   at least one nail part which is formed on a side panel of said front cover, said side panel being formed integrally with said front cover, and is perpendicular to a plate face of said side panel; and
   a hole part which is formed in a vicinity area of one of sides of said rear cover, into said hole part said nail part is inserted,
   wherein said nail part includes:
   a nail insert part to be inserted into said hole part, and
   a pent roof part which touches a rising portion when said nail insert part is inserted into said hole part to limit an insertion amount, wherein said rising portion is a step part which is fabricated by bending the vicinity area of the rear cover into a step shape, and
   wherein said at least one nail part comprises a plurality of nail parts arranged side by side and said each pent roof part of said two neighboring nail parts is consecutively formed.

2. The liquid crystal display apparatus according to claim 1, wherein
   a step part having a step shape including a rising portion and a terrace portion is formed in said vicinity area, and said hole part is formed in said rising portion.

3. The liquid crystal display apparatus according to claim 2, wherein
   said step part is formed partially in said vicinity area which is opposite to said nail part.

4. The liquid crystal display apparatus according to claim 1 further comprising:
   a stopper nail which is formed on said nail part or said terrace portion; and
   a stopper hole which is formed on said terrace portion or said nail part for said stopper nail to fit in.

5. The liquid crystal display apparatus according to claim 4, wherein
   said terrace portion inclines to said internal space side.

6. The liquid crystal display apparatus according to claim 4, wherein
   said terrace portion in said vicinity area which is opposite to said nail part inclines to said internal space side.

7. The liquid crystal display apparatus according to claim 6, wherein
   said nail part is formed on a position of a predetermined distance to the side panel center side from an end face of said side panel, and said side panel on the end face side from said nail part covers said vicinity area.

8. The liquid crystal display apparatus according to claim 7, wherein
   said nail part has a nail tapered part formed on at least one end face corner of a tip side of said nail part; and
   said hole part has a hole tapered part formed on at least one corner of a hole face of said hole part in which said nail part is inserted.

9. The liquid crystal display apparatus according to claim 1, wherein an insulation sheet, which prevents contact of said nail part and said panel unit when said nail part is inserted into said hole part, is installed.

10. A liquid crystal display apparatus which stores a panel unit in an internal space formed by a front cover and a rear cover comprising:
  at least one nail part which is formed on a side panel of said front cover, said side panel being formed integrally with said front cover, and is perpendicular to a plate face of said side panel; and
  an opening part which is formed at a rising portion and a terrace portion of said rear cover, said nail part being inserted into said opening part,
  wherein a gap between said nail part and said rear cover, and a gap between an end face of said terrace portion and said side panel are set to a minimum size respectively, and
  wherein a tip area of said nail part touches said rear cover, and a base area of said nail part touches said terrace portion, whereby said nail part functions to increase the strength of said rear cover against an external force that pushes said rear cover towards a direction of said panel unit.

* * * * *